(12) United States Patent
Saje et al.

(10) Patent No.: US 12,043,315 B2
(45) Date of Patent: Jul. 23, 2024

(54) VEHICLE BODY STRUCTURE FORMED FROM A SYSTEM OF INTERCONNECTED UNITIZED BODY STRUCTURE COMPONENTS AND METHOD OF FORMING A VEHICLE BODY STRUCTURE

(71) Applicant: GM Global Technology Operations LLC, Detroit, MI (US)

(72) Inventors: Robert N. Saje, Shelby Township, MI (US); Warren J. Parsons, Oakland Township, MI (US); Edward D. Moss, Commerce Township, MI (US); Robert M. Kielbik, Chesterfield Township, MI (US); Jean-Michel Steinmetz, Beverly Hills, MI (US); Katelyn Marie McCracken, Pleasant Ridge, MI (US); Keith J. Saari, Macomb Township, MI (US); John Robert Sulik, II, Macomb Township, MI (US); Daniel K. Davis, Williamston, MI (US); Marty F. Hull, Linden, MI (US); Patrick Alfred Walch, Plymouth, MI (US); Vikas V. Joshi, Troy, MI (US); John Joseph Jackson, Chesterfield Township, MI (US); Peter M. Parlow, Columbus, MI (US); Francis J. Malek, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 17/727,233

(22) Filed: Apr. 22, 2022

(65) Prior Publication Data

US 2023/0339548 A1 Oct. 26, 2023

(51) Int. Cl.
*B62D 25/08* (2006.01)
*B62D 25/20* (2006.01)

(52) U.S. Cl.
CPC ......... *B62D 25/08* (2013.01); *B62D 25/2018* (2013.01); *B62D 25/2036* (2013.01)

(58) Field of Classification Search
CPC ............... B62D 25/08; B62D 25/2036; B62D 25/2018; B62D 25/2009; B62D 27/023
(Continued)

(56) References Cited

U.S. PATENT DOCUMENTS 5,347,700 A * 9/1994 Tominaga ............ B23Q 7/1442
29/430
5,593,245 A * 1/1997 Herz .................... B62D 33/044
403/231

(Continued)

*Primary Examiner* — Dennis H Pedder
(74) *Attorney, Agent, or Firm* — CANTOR COLBURN LLP

(57) ABSTRACT

A vehicle underbody includes a system of connected unitized underbody components including a front quadrant system having a left front unitized underbody component and a right front unitized underbody component, a center system, and a rear quadrant system having a left rear unitized underbody component and a right rear unitized underbody component. A first rail element is loosely connected to the left front unitized underbody component and the left rear unitized underbody component, and a second rail element is loosely connected to the right front unitized underbody component and the right rear unitized underbody component.

20 Claims, 15 Drawing Sheets

(58) Field of Classification Search
USPC .......... 296/193.01, 3, 4, 7, 8, 9, 29, 30, 209
See application file for complete search history.

(56) References Cited

U.S. PATENT DOCUMENTS

| | | | | |
|---|---|---|---|---|
| 6,299,240 | B1 * | 10/2001 | Schroeder | B62D 29/008 |
| | | | | 296/29 |
| 6,676,183 | B2 * | 1/2004 | Yoshida | B62D 25/2036 |
| | | | | 296/30 |
| 8,128,160 | B2 * | 3/2012 | Leanza | B62D 25/088 |
| | | | | 296/203.02 |
| 8,424,960 | B2 * | 4/2013 | Rawlinson | B62D 21/152 |
| | | | | 296/203.02 |
| 8,684,450 | B2 * | 4/2014 | Stedman | B62D 25/085 |
| | | | | 296/203.02 |
| 9,802,654 | B2 * | 10/2017 | Moss | B62D 25/2045 |
| 10,000,238 | B2 * | 6/2018 | Buschjohann | B62D 21/08 |
| 10,766,543 | B2 * | 9/2020 | Cha | B62D 21/02 |
| 11,161,548 | B2 * | 11/2021 | Lutz | B62D 29/048 |
| 11,654,968 | B2 * | 5/2023 | Woo | B62D 21/12 |
| | | | | 296/203.01 |

* cited by examiner

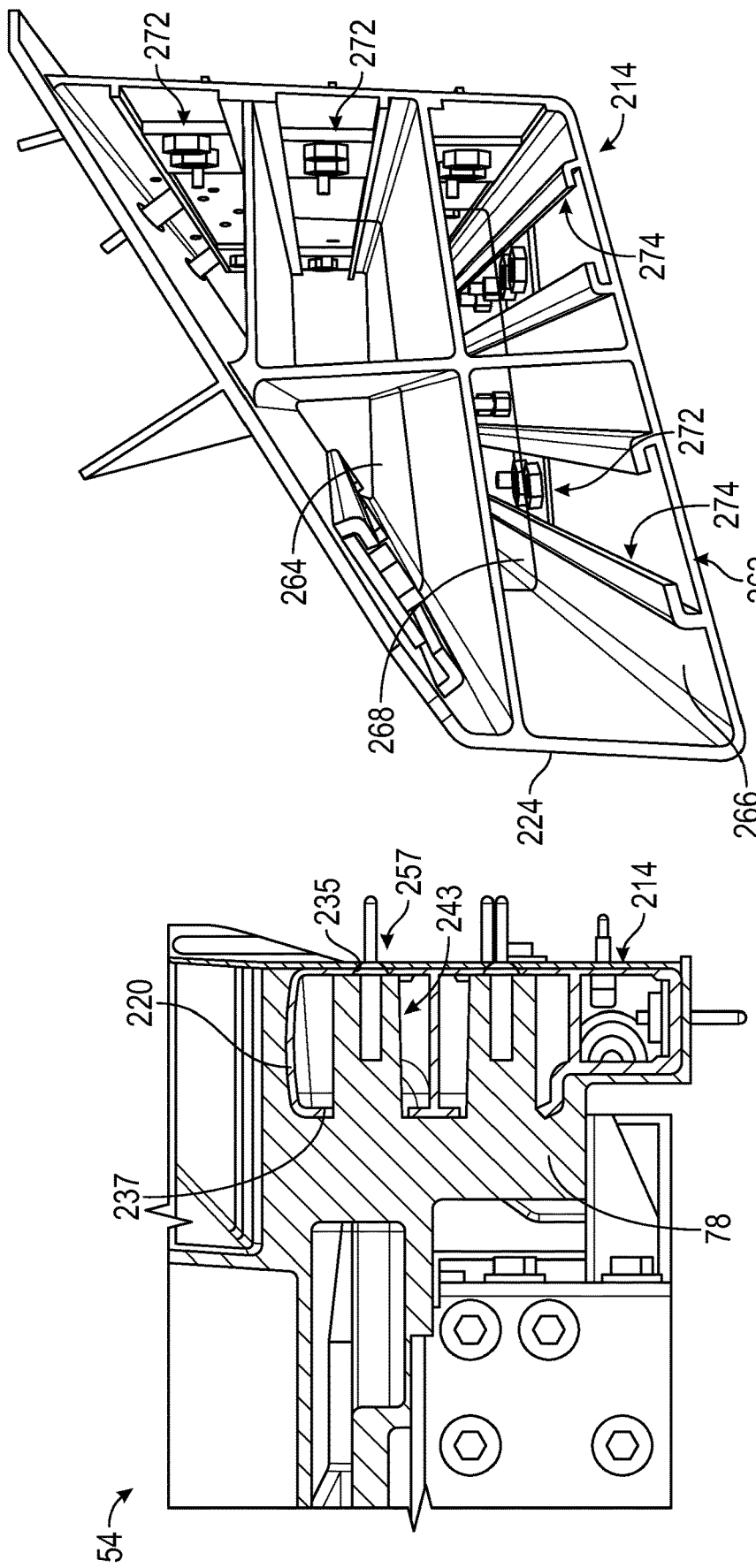
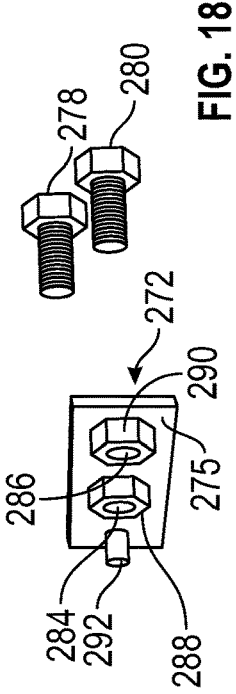
FIG. 17
FIG. 18
FIG. 16

VEHICLE BODY STRUCTURE FORMED FROM A SYSTEM OF INTERCONNECTED UNITIZED BODY STRUCTURE COMPONENTS AND METHOD OF FORMING A VEHICLE BODY STRUCTURE

INTRODUCTION

The subject disclosure relates to the art of vehicle manufacturing and, more particularly, to a vehicle body structure formed from a system of interconnected unitized body structure components.

Many vehicle parts are created through stamping, vacuum forming, molding and the like. Creating a stamping die or mold to form parts is a time consuming and very costly process. A stamping die can cost upwards of one million dollars or more. Typically, a stamping die is formed by subtraction. For example, a block of metal is milled, machined, and drilled to form a desired shape. Once the desired shape in formed, a polishing process is initiated. The subtraction process is time consuming and very wasteful.

Other part forming devices, injection molds, vacuum forming molds and the like are equally costly, time consuming to produce and their formation results in a significant amount of wasted material. The need to reduce part costs in manufacturing automobiles is a long-standing problem. In particular, there is a need to reduce part costs for ultra-low volume/niche automobiles. Niche vehicle programs typically require a high capital expenditure associated with producing an ultra-low volume of components. In order to maintain vehicle cost at an obtainable level an ultra-low volume, ultra-low capital approach is desired.

In addition to reducing part costs, there is a need to reduce vehicle assembly costs. Currently, parts are joined into a myriad of subassemblies. Each part must be properly aligned with a mating part(s) prior to a joining process such as a welding operation. Aligning each part is a time consuming and costly process requiring multiple different fixtures. In addition to the time required to load each fixture, the fixtures themselves are expensive, require maintenance, and periodic calibration. Such an approach secures a desired return on investment needed to keep such programs alive. Accordingly, the industry would welcome a low cost, readily assembled system of ultra-low volume, ultra-low capital cost vehicle underbody components.

SUMMARY

Disclosed, in accordance with a non-limiting example, is a vehicle underbody including a system of connected unitized underbody components including a front quadrant system having a left front unitized underbody component and a right front unitized underbody component, a center system, and a rear quadrant system having a left rear unitized underbody component and a right rear unitized underbody component. A first rail element is loosely connected to the left front unitized underbody component and the left rear unitized underbody component, and a second rail element is loosely connected to the right front unitized underbody component and the right rear unitized underbody component.

In addition to one or more of the features described above or below, or as an alternative, further embodiments could include wherein the first rail element includes a first end, a second end, and an intermediate portion between the first end and the second end, the first end including a first opening and a second opening, a sleeve extends through the first opening, the sleeve including a head portion that abuts an outer surface of the first rail element.

In addition to one or more of the features described above or below, or as an alternative, further embodiments could include wherein the left front unitized underbody component includes a passage that aligns with the first opening, the left front unitized underbody component being joined to the first rail element by low profile connection including a bolt passing through the passage and engaging the sleeve such that tightening the bolt pulls the head portion of the sleeve into the first rail element.

In addition to one or more of the features described above or below, or as an alternative, further embodiments could include wherein the left front unitized underbody component includes a peg, the peg projecting outwardly of the left front unitized underbody component into the second opening of the first rail element.

In addition to one or more of the features described above or below, or as an alternative, further embodiments could include wherein the first rail element includes a first rail section joined to a second rail section.

In addition to one or more of the features described above or below, or as an alternative, further embodiments could include wherein the first rail section includes the first end connected to the left front unitized underbody component and a second end section, and the second rail section includes a first end section connected to the second end section and the second end connected to the left rear unitized underbody component.

In addition to one or more of the features described above or below, or as an alternative, further embodiments could include a fastening element joining the second end section of the first rail section and the first end section of the second rail section.

In addition to one or more of the features described above or below, or as an alternative, further embodiments could include wherein the fastening element includes a plate, a first bolt and a second bolt, the plate including a first plate opening and a second plate opening, the first bolt passing through the first rail section into the first plate opening and the second bolt passing through the second rail section into the second plate opening.

In addition to one or more of the features described above or below, or as an alternative, further embodiments could include wherein the plate includes a first nut mounted at the first plate opening and a second nut mounted at the second plate opening, the first nut being receptive of the first bolt and the second nut being receptive of the second bolt.

In addition to one or more of the features described above or below, or as an alternative, further embodiments could include wherein the plate includes a locator pin that extends outward from the plate through one of the first rail section and the second rail section.

In addition to one or more of the features described above or below, or as an alternative, further embodiments could include a support strut connecting the front quadrant system with a vehicle body.

In addition to one or more of the features described above or below, or as an alternative, further embodiments could include wherein the support strut includes a first member loosely connected to the left front unitized underbody component and the vehicle body, and a second member loosely connected to the right front unitized underbody component and the vehicle body.

In addition to one or more of the features described above or below, or as an alternative, further embodiments could include wherein the support strut includes a third member that loosely connects the first member and the second member at each of the left front unitized underbody component and the right front unitized underbody component.

In addition to one or more of the features described above or below, or as an alternative, further embodiments could include a suspension component mounting assembly loosely connected to the right rear unitized underbody component.

In addition to one or more of the features described above or below, or as an alternative, further embodiments could include wherein the suspension component mounting assembly comprises a bridge member.

Also disclosed, in accordance with a non-limiting example, is a method of assembling a vehicle underbody formed from a system of unitized underbody components includes loosely connecting a left front unitized underbody component and a left rear unitized underbody component with a first rail element, loosely connecting a right front unitized underbody component and a right rear unitized underbody component with a second rail element forming the system of unitized underbody components, placing the system of unitized underbody components into a jig to establish a selected relative position of the left front unitized underbody component, the right front unitized underbody component, the left rear unitized underbody component, and the right rear unitized underbody component, and fixedly connecting the left front unitized underbody component, the right front unitized underbody component, the left rear unitized underbody component, and the right rear unitized underbody component to maintain the selected relative position and form a vehicle underbody.

In addition to one or more of the features described above or below, or as an alternative, further embodiments could include wherein fixedly connecting the left front unitized underbody component, the right front unitized underbody component, the left rear unitized underbody component, and the right rear unitized underbody component includes tightening a plurality of mechanical fasteners.

In addition to one or more of the features described above or below, or as an alternative, further embodiments could include wherein fixedly connecting the left front unitized underbody component, the right front unitized underbody component, the left rear unitized underbody component, and the right rear unitized underbody component includes applying an adhesive.

In addition to one or more of the features described above or below, or as an alternative, further embodiments could include loosely connecting a support strut to each of the left front unitized underbody component, the right front unitized underbody component, and a vehicle body.

In addition to one or more of the features described above or below, or as an alternative, further embodiments could include fixedly connecting the support strut to each of left front unitized underbody component, the right front unitized underbody component, and the vehicle body when the system of unitized underbody components is in the selected relative position.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 16 depicts a cross-sectional front view of the rail element connected to the left front unitized underbody component of FIG. 2 taken through the line 16-16, in accordance with a non-limiting example;

FIG. 17 depicts a sideview of two extruded rail sections of the rail element being joined, in accordance with a non-limiting example;

FIG. 18 depicts a fastening element for joining the two rail sections of the rail element in FIG. 16, in accordance with a non-limiting example;

DETAILED DESCRIPTION

Figure 1:
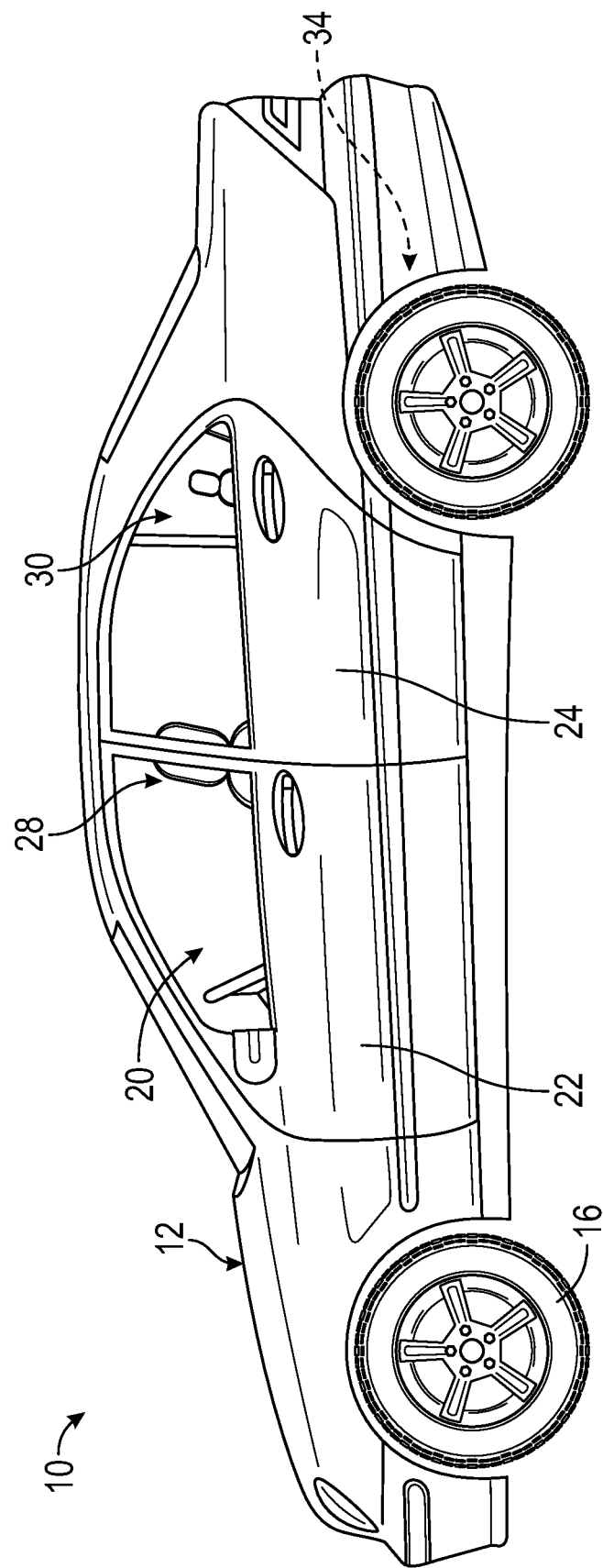
FIG. 1 depicts a vehicle including an underbody formed from a system of interconnected unitized components, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels, one of which is indicated at 16. Body 12 includes a passenger compartment 20 that may be accessed by a front door 22 and or a rear door 24. Additional doors (not shown) may be arranged on an opposing side of vehicle 10. Passenger compartment 20 includes a front seat 28 and a rear seat 30. Vehicle 10 includes an underbody 34 (FIG. 2) formed from a system of unitized underbody components 38.

The term "unitized" describes that each of the underbody components in accordance with a non-limiting example is formed as a single, continuous member without seams, joints, or the like. That is, a unitized component does not undergo any joining processes that might have an impact on material selection. A unitized component has one or more continuous uninterrupted load paths. In a non-limiting example, each of the system of unitized underbody components 38 is formed through a sand casting process. That is, a liquid material, such as metal, metal composite, non-metal, or the like is poured into a mold formed from sand or the like. In another non-limiting example, liquid material, such as metal, metal composites, non-metal, or the like are injected into a mold formed from sand. When hardened, a unitized component is removed from the mold as a single piece. While other processes may be employed, "unitized" clearly describes a component formed as a single piece. The term "unitized system" should be understood to describe a grouping of unitized components.

Figure 2:
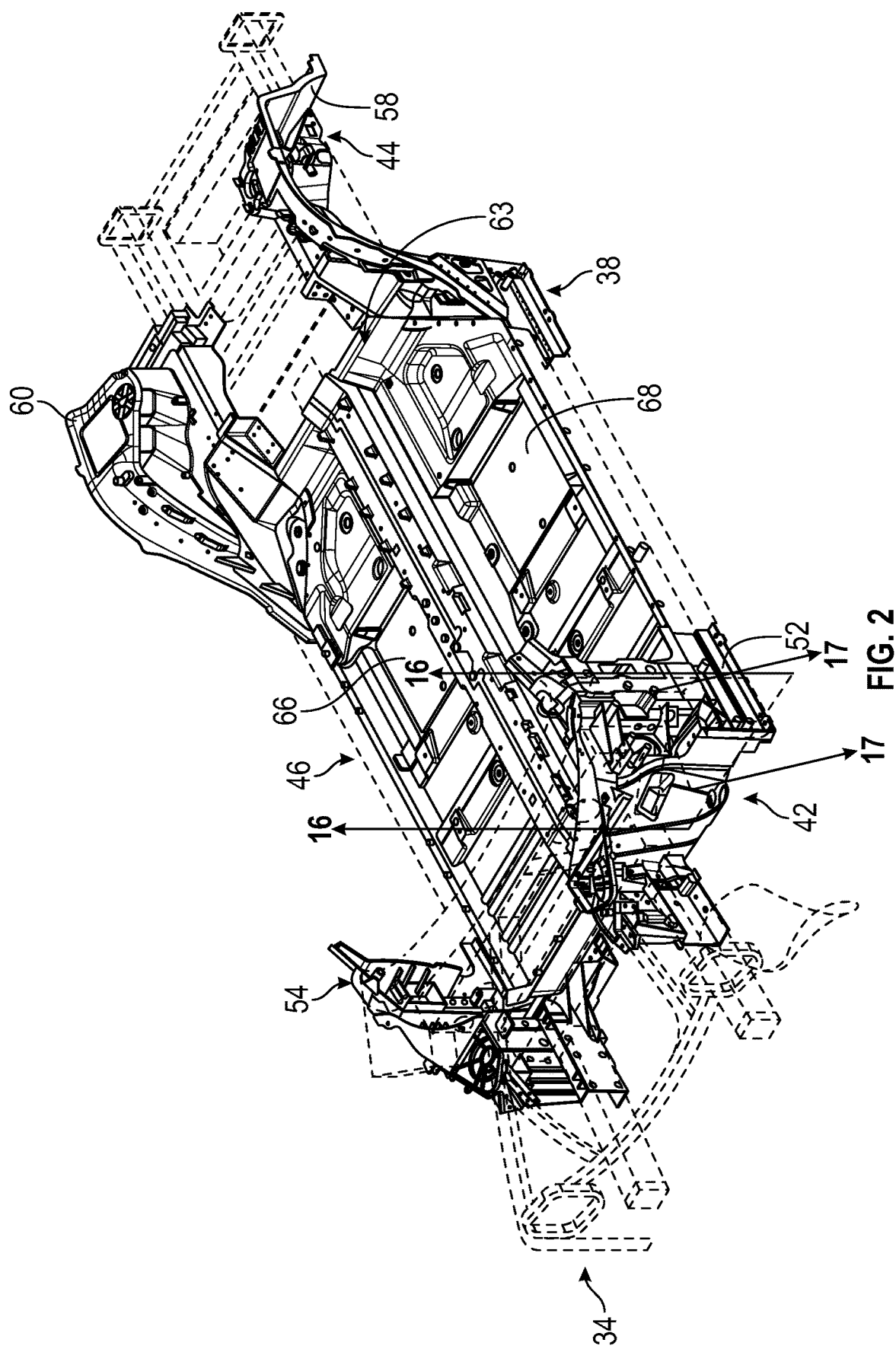
FIG. 2 is a perspective view of the underbody formed from the system of interconnected unitized components, in accordance with a non-limiting example.
Figure 3:
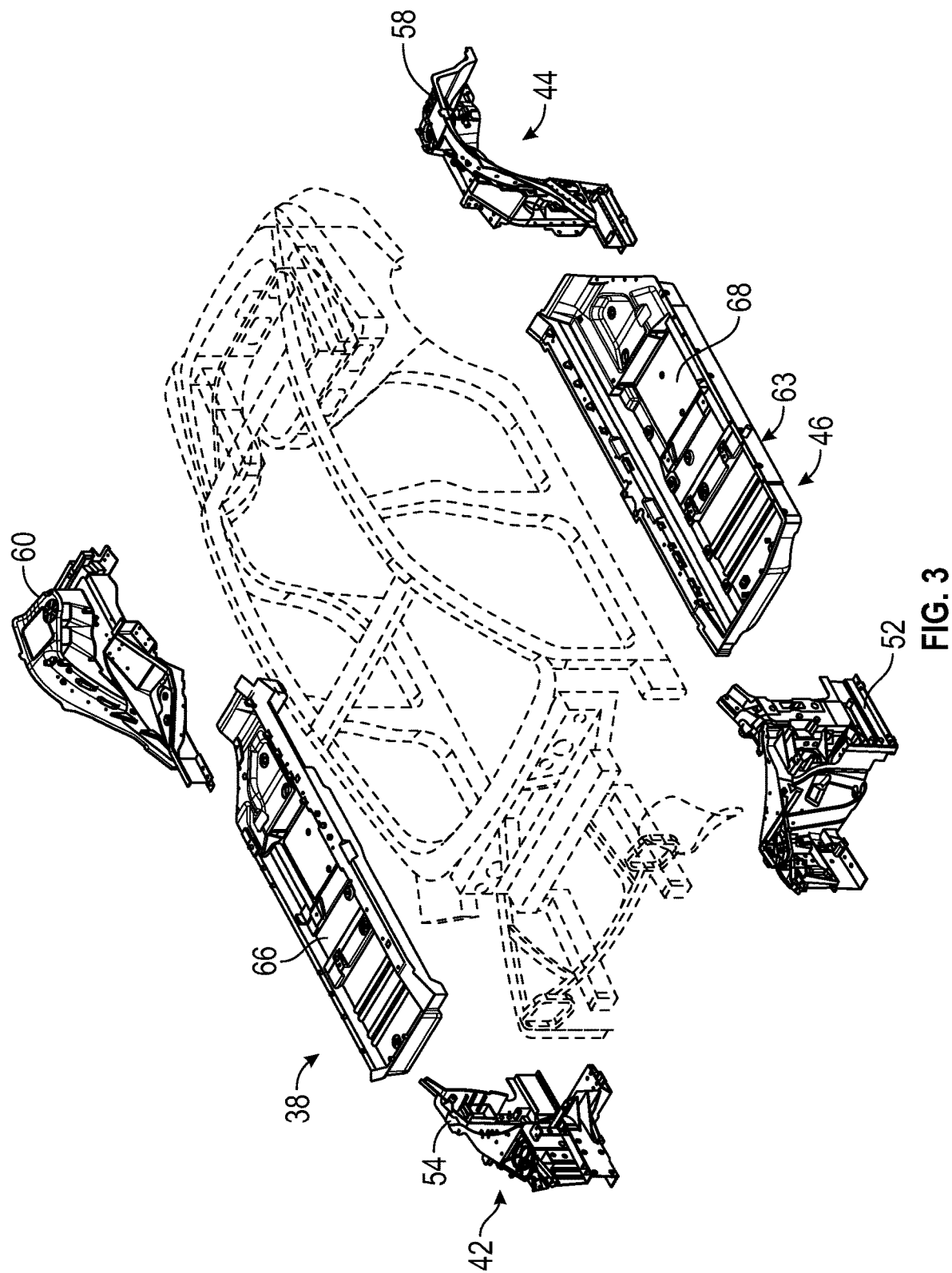
FIG. 3 is a disassembled view of an underbody including a front quadrant system having a left front unitized underbody component and a right front unitized underbody component, a unitized floor system, and a rear quadrant system having a left rear unitized underbody component and a right rear unitized underbody component that collectively form the system of interconnected unitized components, in accordance with a non-limiting example.

Referring to FIGS. 2 and 3 and with continued reference to FIG. 1, a system of unitized underbody components 38 includes a front quadrant system 42, a rear quadrant system 44, and a center system 46. In a non-limiting example, center system 46 extends between and connects with front quadrant system 42 and rear quadrant system 44. In a non-limiting example, front quadrant system 42 includes a left front unitized underbody component 52 including a first front suspension support component (not separately labeled) and a right front unitized underbody component 54 including a second front suspension support component (also not separately labeled). Rear quadrant system 44 includes a left rear unitized underbody component 58 including a first rear suspension support component (not separately labeled) and a right rear unitized underbody component 60 including a second rear suspension support component (also not separately labeled).

In a non-limiting example, center system 46 takes the form of a unitized floor system 63 including a first unitized floor member 66 joined to a second unitized floor member 68. At this point, it should be understood that the unitized components form part of the vehicle underbody, unitized components may be employed in other areas, both structural and non-structural in vehicle 10. Further, additional underbody components not discussed herein may be unitized components.

Figure 4:
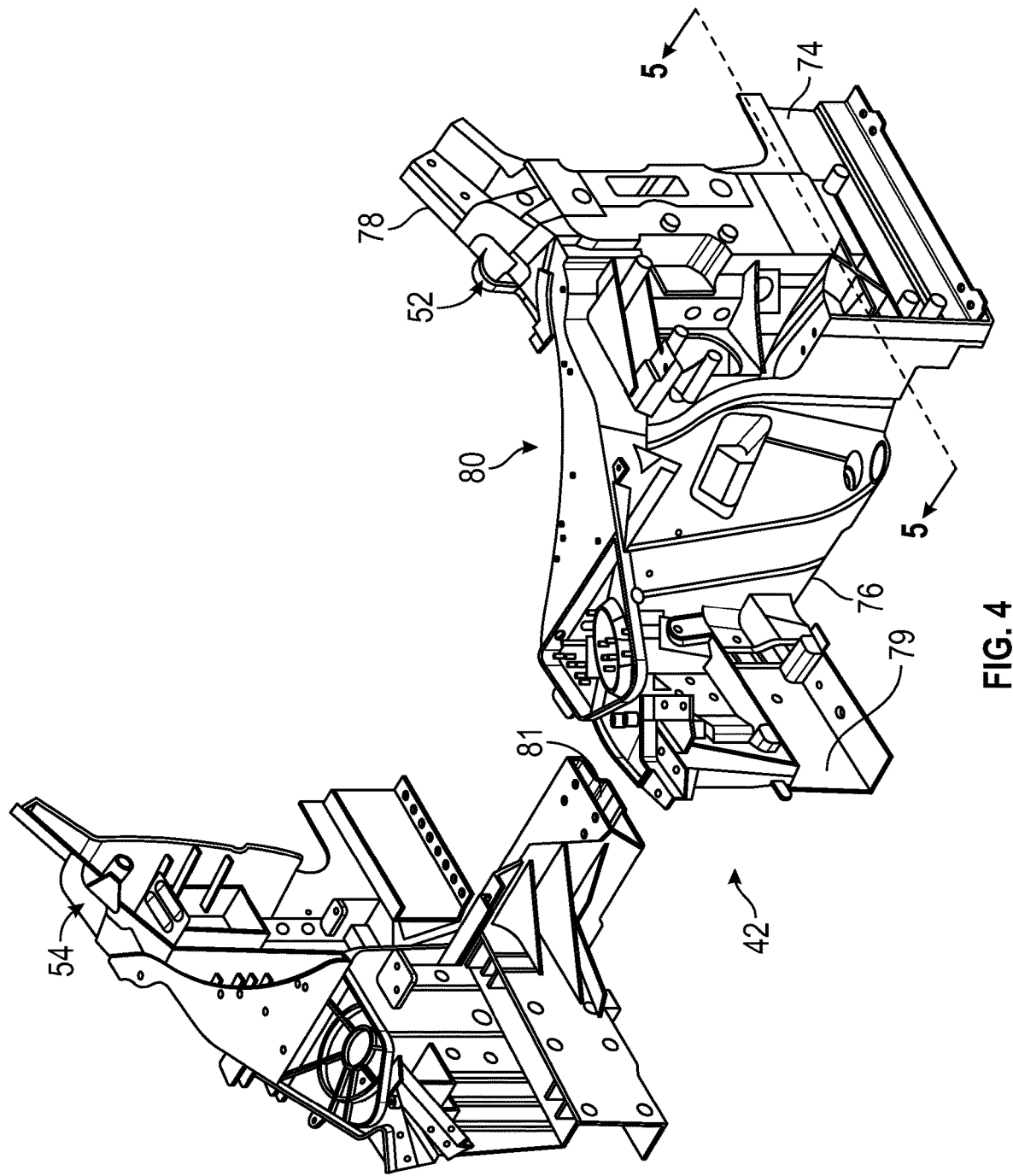
FIG. 4 is a perspective view of the front quadrant system including the left and right front unitized underbody components, in accordance with a non-limiting example.
Figure 5:
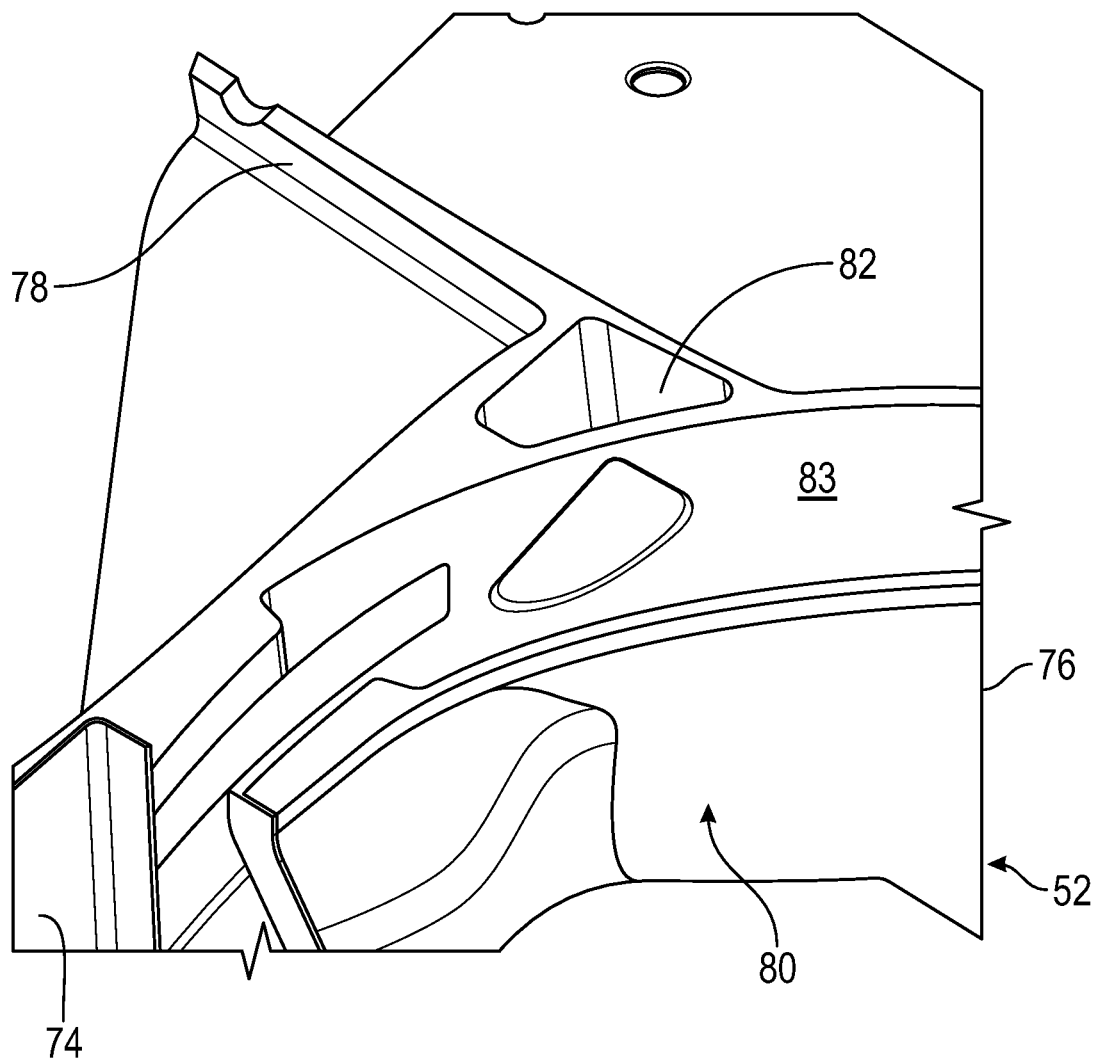
FIG. 5 is a cross-sectional view of the left unitized underbody component of the front quadrant of FIG. 4 taken through the line 5-5, in accordance with a non-limiting example.

Reference will now follow to FIGS. 4 and 5 and with continued reference to FIGS. 2 and 3 in describing left front unitized underbody component 52 of front quadrant system 42 with an understanding that right front unitized underbody component 54 includes similar structure. Left front unitized underbody component 52 defines a left front corner of underbody 34. In a non-limiting example, left front unitized underbody component 52 includes a first rail member 74, a second rail member 76, a third rail member 78, and a fourth rail member 79 that are joined at an intersection 80. Second rail member 76 defines a socket (not separately labeled) having a hollow interior such as shown at 81 in connection with right front unitized underbody component 54 in FIG. 4. In a non-limiting example, left front unitized underbody component 52 includes a hollow portion 82 defined, in part, by a bridge rail 83 at intersection 80 as shown in FIG. 5. Hollow portion 82 provides for a weight reduction of left front unitized underbody component 52 without sacrificing structure integrity provided by first, second, and third rails 74, 76, and 78 respectively.

Figure 6:
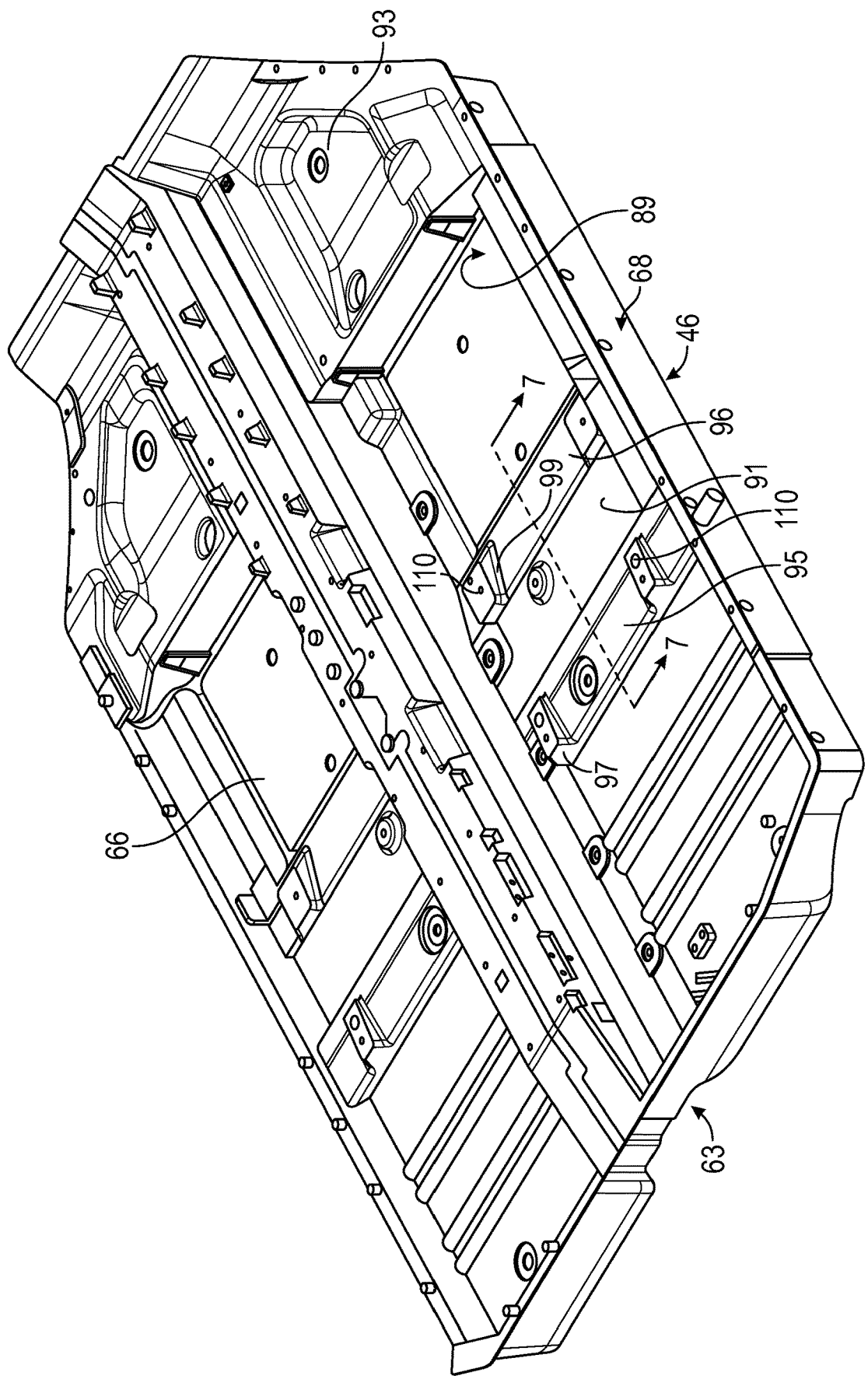
FIG. 6 depicts the unitized floor system of the underbody formed from the system of interconnected unitized components, in accordance with a non-limiting example.
Figure 7:
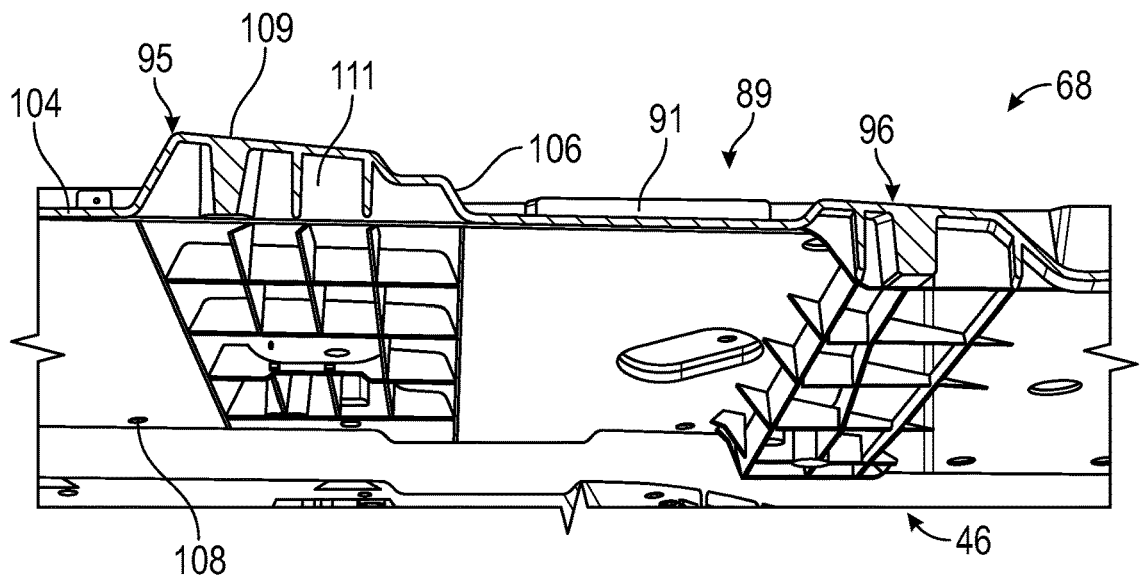
FIG. 7 is a cross-sectional view of a portion of the unitized floor system of FIG. 6 taken through the line 7-7 illustrating hollow cores, in accordance with a non-limiting example.
Figure 8:
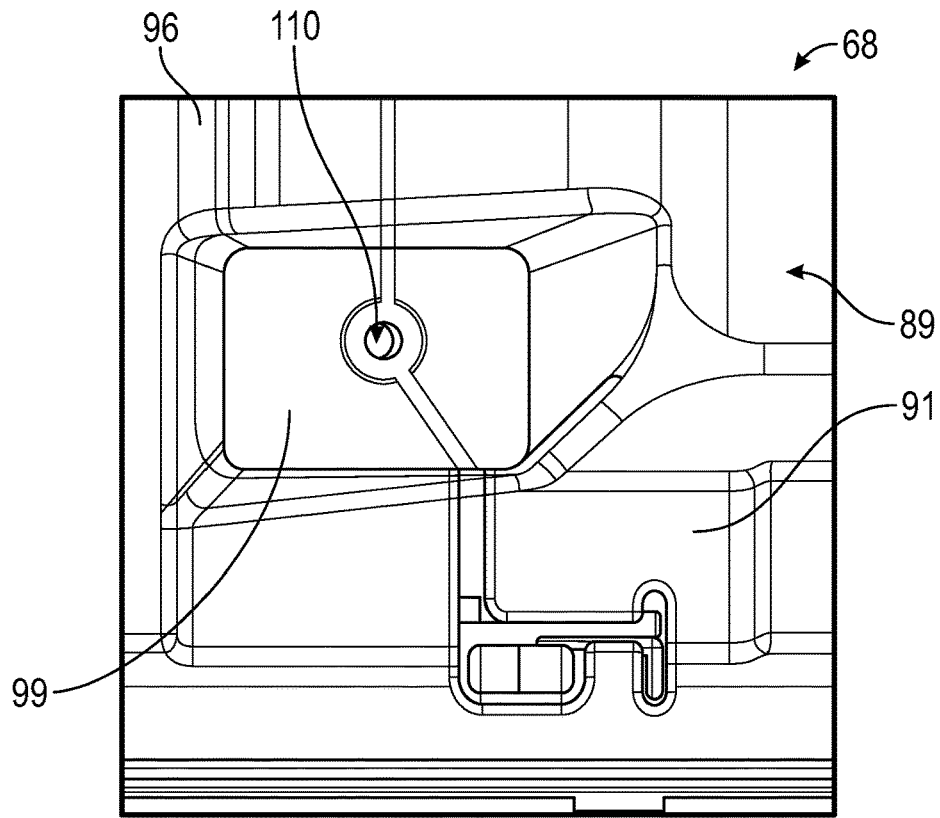
FIG. 8 depicts a rib formed in the internal core of FIG. 7, in accordance with a non-limiting example.

Reference will now follow to FIGS. 6-8 in describing second unitized floor member 68 in accordance with a non-limiting example, with an understanding that first unitized floor member 66 includes similar structure. In a non-limiting example, second unitized floor member 68 includes a floor surface 89 having a first section 91 and a second section 93 that is off-set relative to first section 91. In a non-limiting example, first section 91 includes a first plurality of hollow cores 95 and a second plurality of hollow cores 96. First plurality of hollow cores 95 provide structural support to first section 91 and includes a first plurality of raised bosses 97. Second plurality of hollow cores 96 provide additional structural support to first section 91 and includes a plurality of raised bosses 99. At this point, it should be understood that while described as having hollow cores, first and second unitized floor members 66 and 68 can also include raised ribs.

In a non-limiting example depicted in FIG. 7, first section 91 defines a first thickness 104 of second unitized floor member 68 and each of the first plurality of hollow cores 95 and second plurality of hollow cores 96 defines a second thickness such as shown at 106 that is greater than the first thickness. In a non-limiting example, the first plurality of hollow cores 95 include openings (not separately labeled) that receive bolts (also not separately labeled) that serve as an interface between floor surface 89 and another surface 108 of a support member 109 as shown in FIG. 7. First plurality of hollow cores 95 includes internal cells 111 that provide additional support that enables second unitized floor member 68 to support and manage greater loads.

In a non-limiting example, second plurality of raised bosses 99 serve as an interface to, for example, seat rails (not shown). As such, each of the second plurality of raised bosses 99 include an opening 110 as shown in FIG. 8 that may be used to receive a mechanical fastener, such as a nut (also not shown). By forming the first and second pluralities of hollow cores 95 and 96 and the corresponding first and second pluralities of raised bosses 97 and 99 with second unitized floor member 68, structural integrity is enhanced and the need to provide additional interface devices is avoided.

Figure 9:
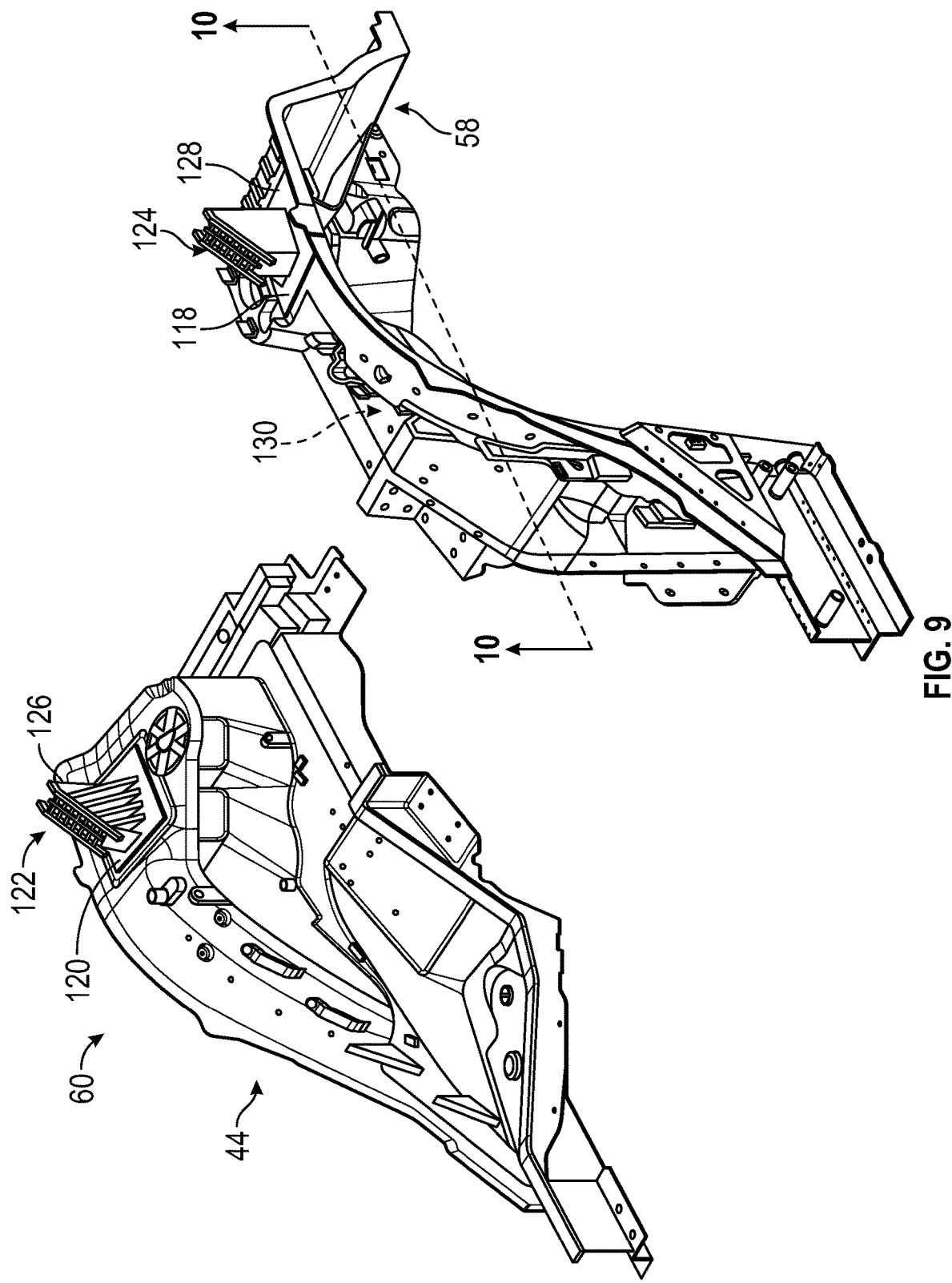
FIG. 9 is a perspective view of the rear quadrant system including the left and right unitized rear underbody components, in accordance with a non-limiting example.

Reference will now follow to FIG. 9 in describing rear quadrant system 44 in accordance with a non-limiting example. Left rear unitized underbody component 58 may include a first mounting surface 118 and right rear unitized underbody component 60 may include a second mounting surface 120. Each mounting surface 118, 120 supports bridge members 122 and 124 respectively that connect between rear quadrant system 44 and structure disposed above rear quadrant system 44 such as portions of body 12. In a non-limiting example, bridge members 122 and 124 are initially loosely connected to mounting surfaces 118 and 120 and not only provide an interface with, for example, body 12 but also establish slip planes in order to establish a desired part-to-part alignment. Further, in a non-limiting example, left rear unitized underbody component 58 and right rear unitized underbody component 60 include internal structural support members as will be detailed herein.

Figure 10:
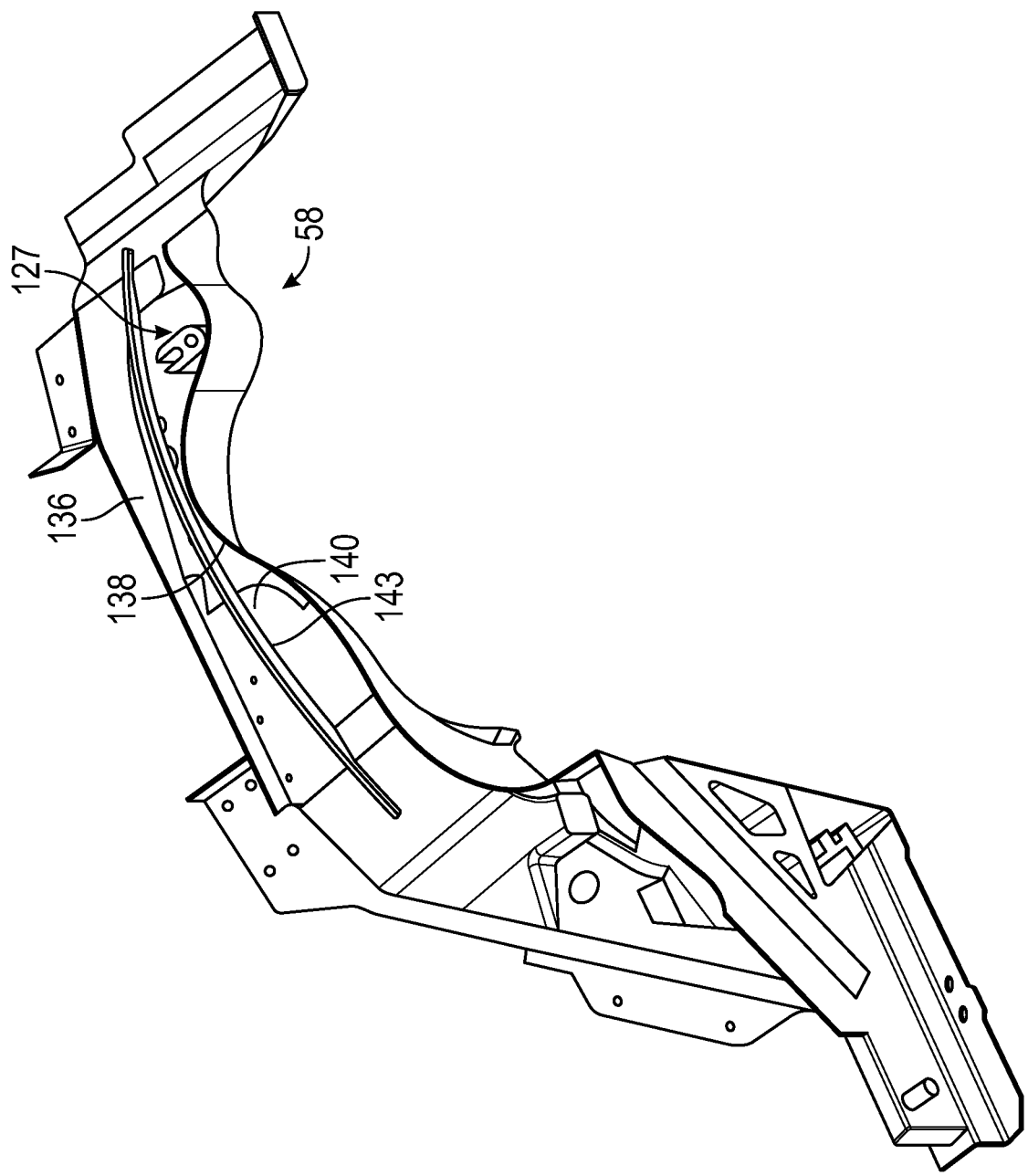
FIG. 10 depicts a cut-away view of a portion of the left unitized rear underbody component of FIG. 9 taken through the line 10-10, in accordance with a non-limiting example.
Figure 12:
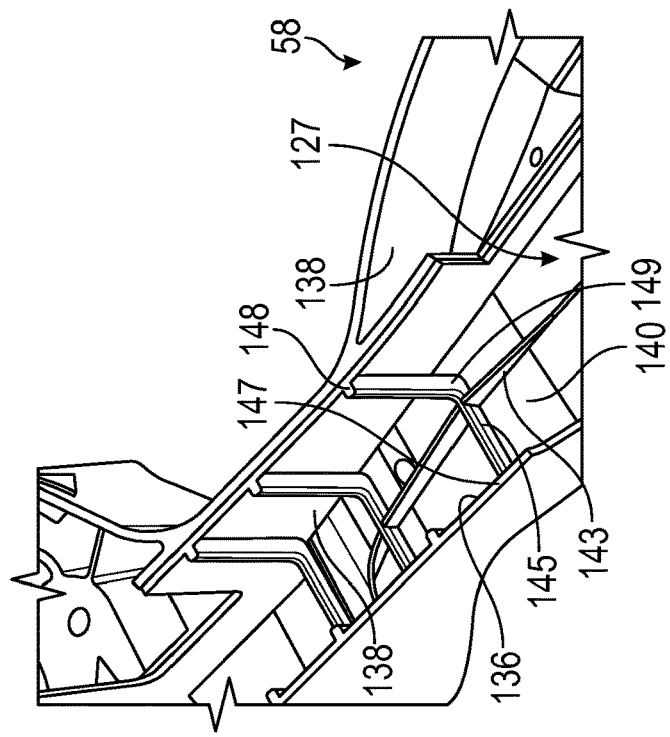
FIG. 12 is a detail view of the portion of the internal core of the left unitized rear underbody component of FIG. 11, in accordance with a non-limiting example.
Figure 11:
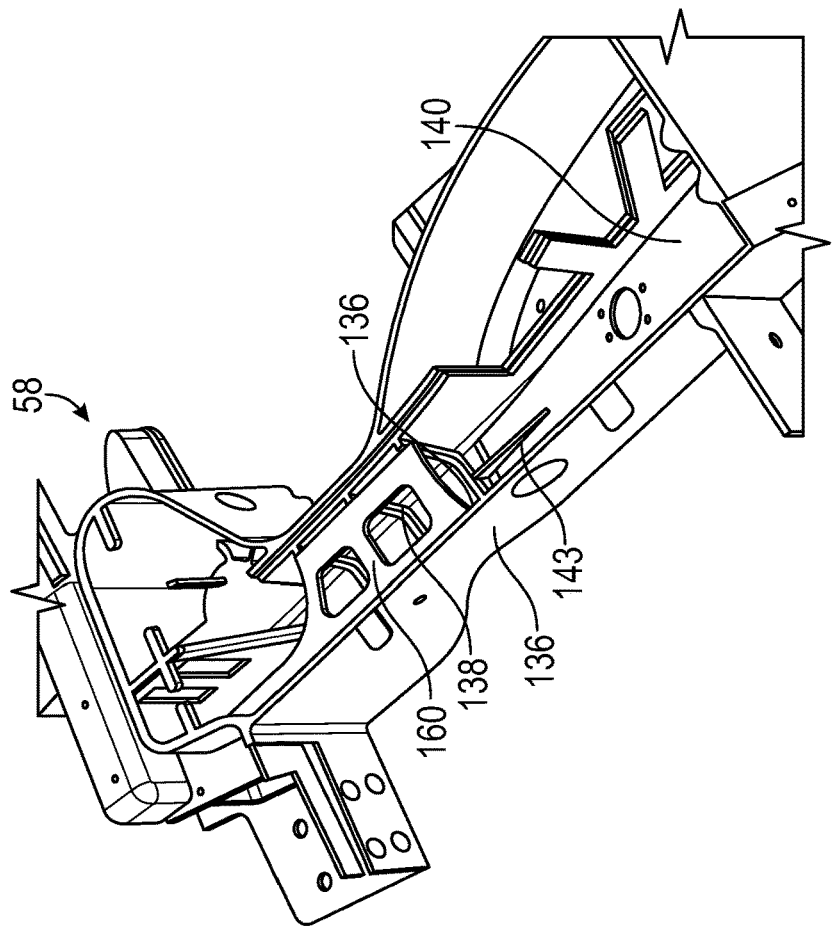
FIG. 11 is a detail view of the portion of the left unitized rear underbody component of FIG. 10 having an internal core, in accordance with a non-limiting example.

Reference will follow to FIGS. 10-12 and with continued reference to FIG. 9 in describing left rear unitized underbody component 58 with an understanding that right rear unitized underbody component 60 includes similar structure. In a non-limiting example, left rear unitized underbody component 58 includes a hollow portion 127 having a generally U-shaped cross-section including a first side wall 136, a second side wall 138, and a base wall 140. Base wall 140 extends between and is formed with first side wall 136 and second side wall 138. In a non-limiting example, a vertical wall 143 is formed with and projects outwardly of base wall 140 between first side wall 136 and second side wall 138. Vertical wall 143 provides structural support to left rear unitized underbody component 58 at, for example first mounting surface 118.

In a non-limiting example, additional hollow cores, one of which is indicated at 145 are formed in hollow portion 127. Additional hollow cores 145 bisect vertical wall 143 and include a first portion 147, a second portion 148, and a third portion 149. First portion 147 projects outwardly from first side wall 136, second portion 148 projects outwardly from second side wall 138, and third portion 149 projects outwardly of base wall 140. Third portion 149 bisects vertical wall 143. In a non-limiting example, hollow portion 127 may also include an internal rail 160 (FIG. 11) that is formed with first side wall 136 and second side wall 138 and is spaced from base wall 140. Internal rail 160 defines a rail within a rail that provides additional support that is not possible through stamping and other part forming techniques. That is, sand casting allows for the creation of internal hollows that reduce weight while also providing additional structural support. Sand cores may be strategically placed within a component and then removed to form the internal hollows.

In accordance with a non-limiting example, the system of unitized underbody components 38 starts out as an assembly of loosely connected parts that are aligned and finally secured to one another as will be detailed herein. The term "loosely connected" should be understood to describe that the system of unitized underbody components 38 are mechanically connected to one another in a manner that allows for movement, adjustment, positioning, repositioning, and alignment. In contrast, welding creates a tight connection that is not moveable. Thus, the assembly of loosely connected parts should be understood to describe a flexible or adjustable assembly that allows for manipulation, alignment, compliance, and the like prior to a final joining operation.

Figure 13:
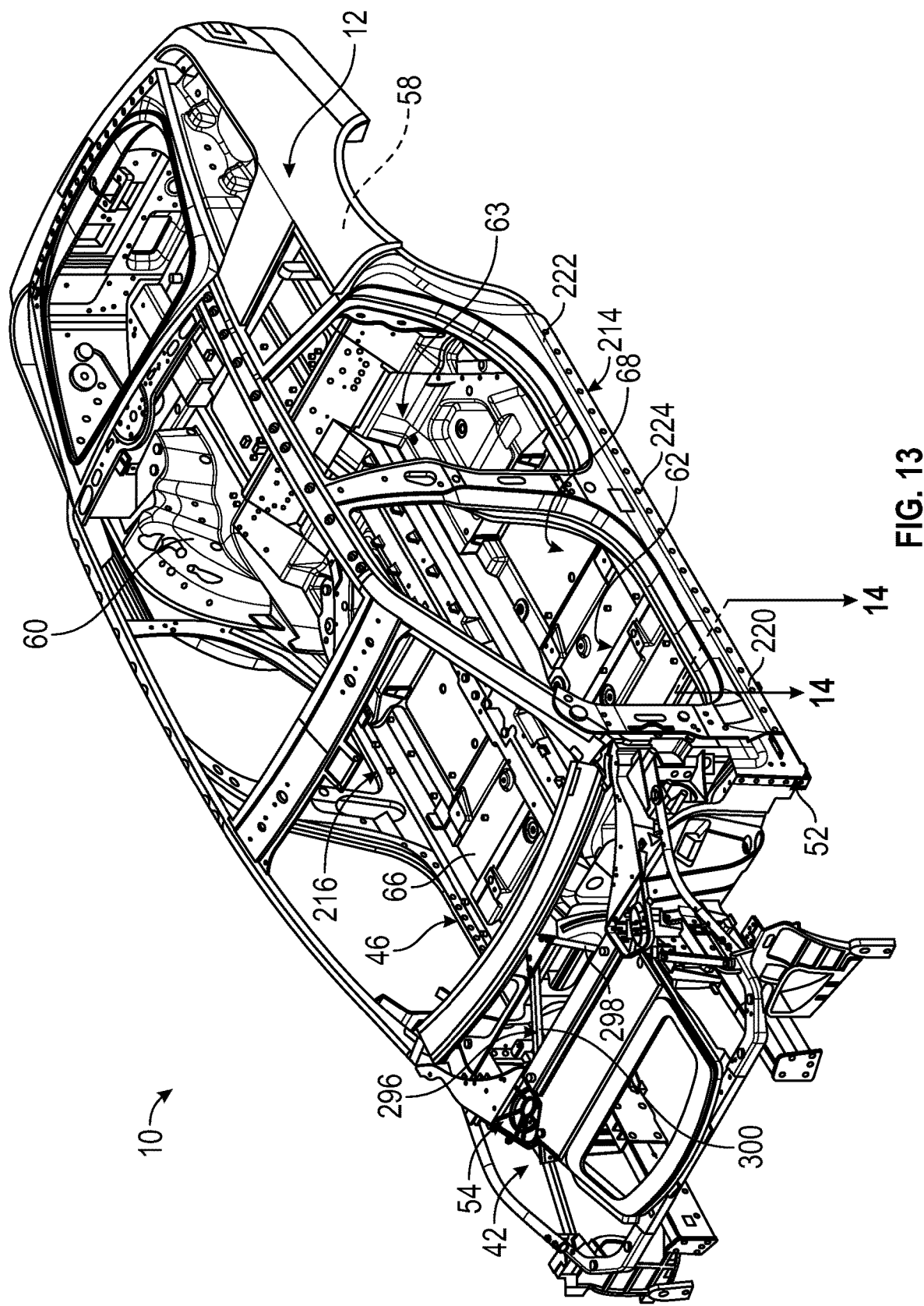
FIG. 13 depicts portions of a vehicle body mounted to the underbody formed from a system of interconnected unitized components, in accordance with a non-limiting example.

Reference will now follow to FIGS. 13-16 with continued reference to FIGS. 1-4 in describing a low profile connection (not separately labeled) between front quadrant system 42 and rear quadrant system 44 in accordance with a non-limiting example. As shown in FIG. 13, a first rail element 214 initially loosely connects left front unitized underbody component 52 and left rear unitized underbody component 58. A second rail element 216 initially loosely connects right front unitized underbody component 54 and right rear unitized underbody component 60. First and second rail elements 214 and 216 may include a unitized, closed cross-section. Unitized floor system 63 is initially loosely connected to first rail element 214 and second rail element 216. In a non-limiting example, first unitized floor member 66 is joined to second rail element 216 and second unitized floor member 68 is joined to first rail element 214.

A description will follow referencing first rail element 214 with an understanding that second rail element 216 includes similar structure. First rail element 214 includes a first end 220 connected to left front unitized underbody component 52 and a second end 222 connected to left rear unitized underbody component 58. An intermediate portion 224 extends between first end 220 and second end 222.

Figure 15:
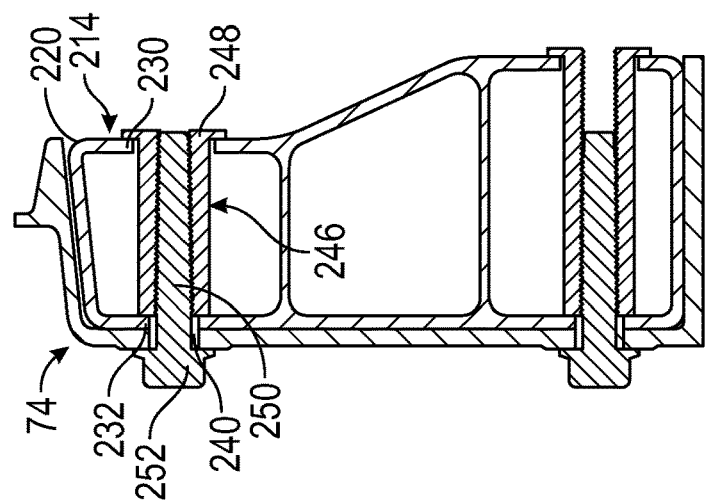
FIG. 15 depicts a cross-sectional view of the rail element of FIG. 14 taken through the line 15-15, in accordance with a non-limiting example.
Figure 14:
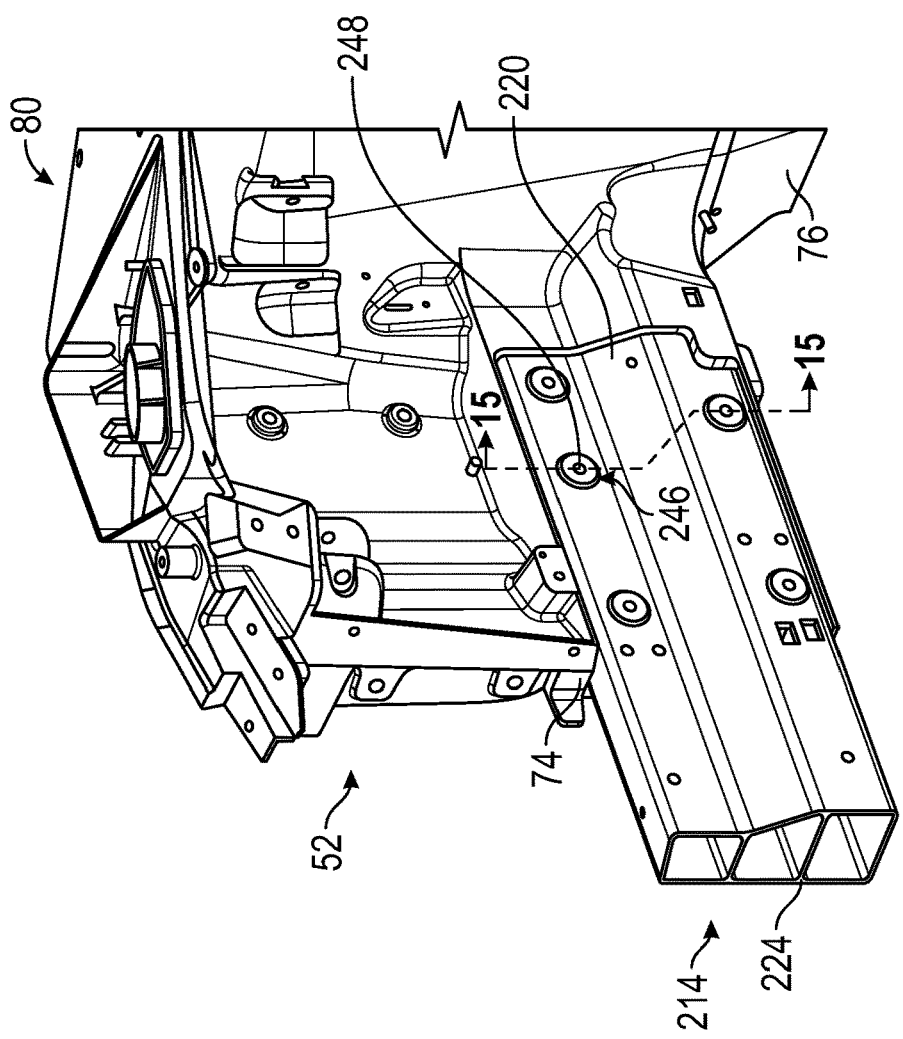
FIG. 14 depicts a cross-section of a rail element in FIG. 13 taken through the line 14-14 having a unitized closed cross-section being joined to a left front unitized underbody component of a front quadrant system in the underbody formed from a system of interconnected unitized components, in accordance with a non-limiting example.

In a non-limiting example shown in FIGS. 14 and 15, a first opening 230 is formed in first rail element 214 at first end 220 as shown in FIG. 15. A first opening portion 232 is formed in first end 220 of first rail element 214 opposite to first opening 230. First opening portion 232 is spaced from and aligned with first opening 230. At this point it should be understood that the number of first openings and first opening portions may vary. A second opening 235 is formed in first end 220 longitudinally spaced from first opening 230 towards second end 222 as shown in FIG. 16. A second opening portion 237 is formed in first end 220 longitudinally spaced from first opening portion 232 toward second end 222. Second opening portion 237 is spaced from and aligned with second opening 235. At this point, it should be understood that the number of second openings 235 and second opening portions 237 may vary.

In a non-limiting example, left front unitized underbody component 52 includes a passage 240 formed in first rail 74. Passage 240 aligns with first opening 230 and first opening portion 232 when first rail element 214 is installed. First rail 74 also includes a peg(s) 243 that aligns with second opening 235 and second opening portion 237 as shown in FIG. 16. In a non-limiting example, peg 243 extends into second opening portion 237 toward second opening 235. At this point, it should be understood that the number of passages and the number of pegs may vary. That is, the number of passages corresponds to the number of first openings and first opening portions and the number of pegs corresponds to the number of second openings and second opening portions.

In a non-limiting example, a sleeve 246 is installed into first rail element 214 at first end 220. Sleeve 246 includes a head portion 248 and is installed into first opening 230 and first opening portion 232. Head portion 248 abuts first rail element 214 at first opening 230. In a non-limiting example, a mechanical fastener 250 is passed through first opening portion 232 and passage 240 into sleeve 246. Mechanical fastener 250 may be loosely connected to sleeve 246. However, during a final assembly, mechanical fastener 250 is tightened pulling head portion 248 of sleeve 246 against first rail element 214. Similarly, when connecting first rail element 214 to left front unitized underbody component 52, peg(s) 243 are passed through second opening portion(s) 237. Peg(s) 243 create a selected alignment between first rail element 214 and left front unitized underbody component 52. Mechanical fastener members 257 may be passed through second opening(s) 235 and mechanically engaged with peg(s) 243.

In a non-limiting example depicted in FIGS. 17 and 18, first rail element 214 may include a first rail section 262 connected to a second rail section 264. In a non-limiting example, first rail section 262 includes first end 220 (FIG. 13) and a second end section 266. Second rail section 264 includes a first end section 268 and second end 222 (FIG. 13). Second end section 266 is connected to first end section 268 by a plurality of fastening elements, one of which is shown at 272 in FIG. 18. The number and location of fastening elements may vary. Fastening elements 272 are received in slots 274.

In a non-limiting example, fastening element 272 includes a plate 275 that slides into slot 274, a first bolt 278 and a second bolt 280. First bolt 278 is passed through first rail section 262 at second end section 266 and second bolt 280 is passed through second rail section 264 at first end section 268. First and second bolts 278 and 280 pass through corresponding first and second plate openings 284 and 286 in plate 275. A first nut 288 is coupled to plate 275 at first plate opening 284 and a second nut 290 is coupled to plate 275 at second plate opening 286. First and second bolts 278 and 280 engage with first and second nuts 288 and 290 respectively. Plate 275 may also support a locator pin 292. In a non-limiting example, locator pin 292 passes into one of first and second rail sections 262 and 264 to establish a selected alignment of plate 275.

Figure 20:
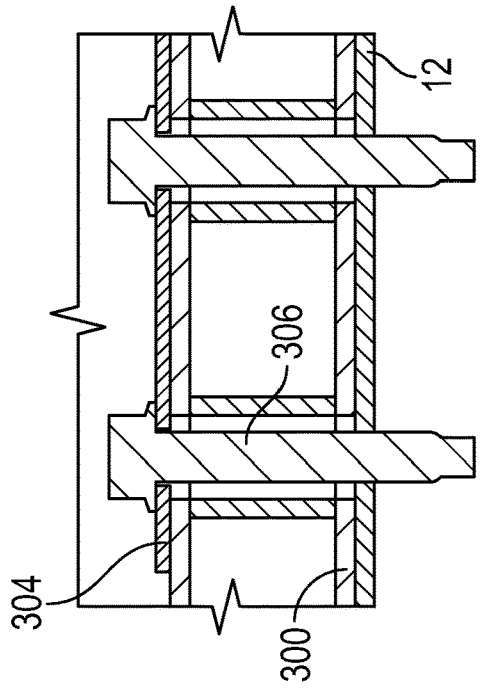
FIG. 20 depicts a first portion of the front support strut joined to the body of FIG. 12, in accordance with a non-limiting example.
Figure 21:
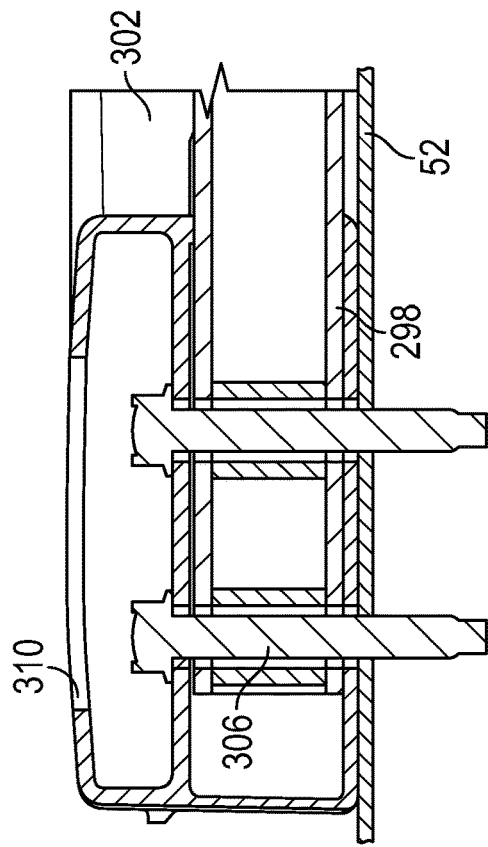
FIG. 21 depicts a second portion of the front support strut of FIG. 19 connected to the front quadrant of the underbody formed from the system of interconnected unitized components, in accordance with a non-limiting example.
Figure 19:
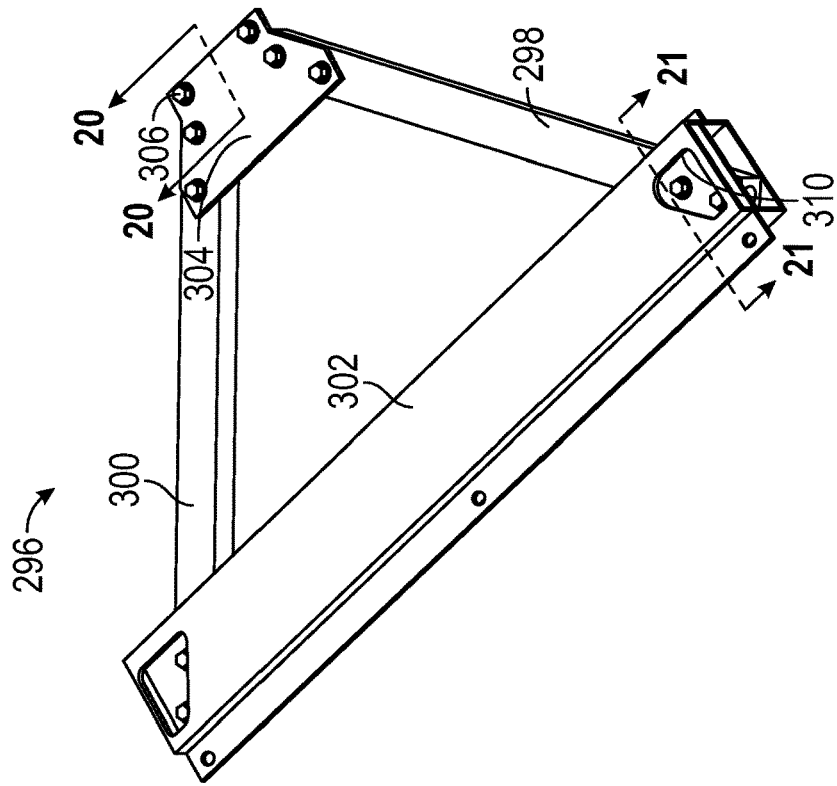
FIG. 19 depicts a front support strut of the vehicle of FIG. 12, in accordance with a non-limiting example.

As shown in FIG. 19, in a non-limiting example, vehicle 10 includes a support strut 296 that connects left front unitized underbody component 52 and right front unitized underbody component 54 with body 12 as shown in FIG. 13. Referring to FIGS. 19-21, support strut 296 includes a first member 298 that connects left front unitized underbody component 52 with body 12. A second member 300 connects right front unitized underbody component 54 with body 12. A third member 302 connects first member 298 and second member 300. Third member 302 may connect first and second members 298 and 300 at corresponding ones of left front unitized underbody component 52 and right front unitized underbody component 54. A plate 304 may be provided at first and second members 298 and 300 at body 12.

In a non-limiting example, a first plurality of mechanical fastener members 306 pass through plate 304 into second member 300 and connect with body 20 as shown in FIG. 20. Additional fasteners (not separately labeled) pass through plate 304 through first member 298 and connect with body 12. Mechanical fastener members 306 also pass through third member 302, second member 300 and into left front unitized underbody component 52 as shown in FIG. 21. Additional mechanical fastener members (also not separately labeled) pass through third member 302, second member 300 and connect with right front unitized underbody component 54. In a non-limiting example, mechanical fastener members 306 may reside within third member 302. That is, third member 302 may include openings 310 that receive mechanical fastener members 306. In this manner, direct surface to surface pressure is established between third member 302 and first member 298 for example. With this arrangement, all of the components that form unitized underbody 34 may be initially loosely connected. The loosely connected components may then be placed in a fixture or jig 400 shown in FIG. 22, positioned, repositioned, and aligned to selected dimensions and then tightened.

Figure 22:
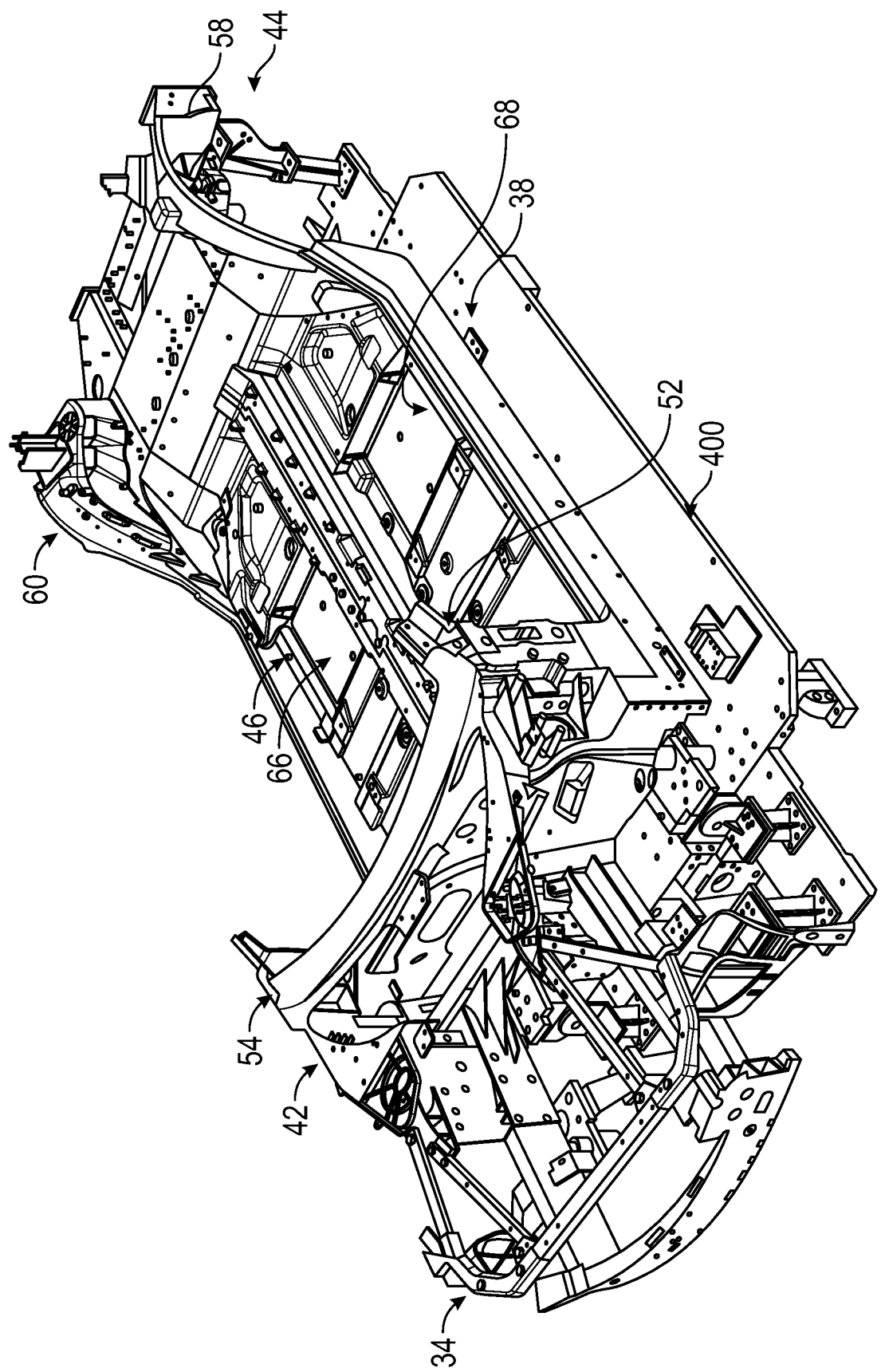
FIG. 22 depicts the underbody formed from the system of interconnected unitized components mounted in an assembly fixture, in accordance with a non-limiting example.

For example, left front unitized underbody component 52 and left rear unitized underbody component 58 may be loosely connected through first rail element 214. Right front unitized underbody component 54 and right rear unitized underbody component 60 may be loosely connected by second rail element 216 forming the system of unitized underbody 34. Once loosely connected, system of unitized underbody components 38 may be placed into a fixture or jig 400 such as shown in FIG. 22 to establish a selected relative position of the left front unitized underbody component 52, right front unitized underbody component 54, left rear unitized underbody component 58, and right rear unitized underbody component 60. Once in a selected position, left front unitized underbody component 52, right front unitized underbody component 54, left rear unitized underbody component 58, and right rear unitized underbody component 60 are fixedly connected to one another so as to maintain the selected relative positions and form a vehicle underbody. While shown as being positioned in fixture 400 as a full assembly, each of the a front quadrant system 42, rear quadrant system 44, and center system 46 may be assembled either loosely, or finally in separate fixtures before being combined in fixture 400.

In a non-limiting example, fixedly connecting left front unitized underbody component 52, right front unitized underbody component 54, left rear unitized underbody component 58, and right rear unitized underbody component 60 includes tightening the plurality of mechanical fasteners 250, mechanical fastener members 257, fastening elements 272, bolts 278 and 280. In another non-limiting example, fixedly connecting left front unitized underbody component 52, right front unitized underbody component 54, left rear unitized underbody component 58, and right rear unitized underbody component 60 includes applying an adhesive.

The use of unitized components and bolted/adhesive connections, not only eliminates the need for and costs associated with producing stamping dies and other expensive forming elements but also reduces the need for robots programmed for complex operations. That is, the underbody may be formed using a single fixture and robots programmed for simple tasks such as spot welding, flow drill screwing, and or self-piercing rivets. Further, while described in terms of underbody components, unitized components such as described herein may be used in other areas of the body structure of the vehicle.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle underbody comprising:
a system of connected unitized underbody components including a front quadrant system having a left front unitized underbody component including a first front suspension support component and a right front unitized underbody component including a second front suspension support component, a center system, and a rear quadrant system having a left rear unitized underbody component including a first rear suspension component support and a right rear unitized underbody component including a second rear suspension component support;
a first rail element loosely connected to the left front unitized underbody component and the left rear unitized underbody component; and
a second rail element loosely connected to the right front unitized underbody component and the right rear unitized underbody component.

2. The vehicle underbody according to claim 1, wherein the first rail element includes a first end, a second end, and an intermediate portion between the first end and the second end, the first end including a first opening and a second opening, a sleeve extending through the first opening, the sleeve including a head portion that abuts an outer surface of the first rail element.

3. The vehicle underbody according to claim 2, wherein the left front unitized underbody component includes a passage that aligns with the first opening, the left front unitized underbody component being joined to the first rail element by a low profile connection including a bolt passing through the passage and engaging the sleeve such that tightening the bolt pulls the head portion of the sleeve into the first rail element.

4. The vehicle underbody according to claim 2, wherein the left front unitized underbody component includes a peg, the peg projecting outwardly of the left front unitized underbody component into the second opening of the first rail element.

5. The vehicle underbody according to claim 2, wherein the first rail element includes a first rail section joined to a second rail section.

6. The vehicle underbody according to claim 5, wherein the first rail section includes the first end connected to the left front unitized underbody component and a second end section, and the second rail section includes a first end section connected to the second end section and the second end connected to the left rear unitized underbody component.

7. The vehicle underbody according to claim 6, further comprising a fastening element joining the second end section of the first rail section and the first end section of the second rail section.

8. The vehicle underbody according to claim 7, wherein the fastening element includes a plate, a first bolt and a second bolt, the plate including a first plate opening and a second plate opening, the first bolt passing through the first rail section into the first plate opening and the second bolt passing through the second rail section into the second plate opening.

9. The vehicle underbody according to claim 8, wherein the plate includes a first nut mounted at the first plate opening and a second nut mounted at the second plate opening, the first nut being receptive of the first bolt and the second nut being receptive of the second bolt.

10. The vehicle underbody according to claim 9, wherein the plate includes a locator pin that extends outward from the plate through one of the first rail section and the second rail section.

11. The vehicle underbody according to claim 1, further comprising a support strut connecting the front quadrant system with a vehicle body.

12. The vehicle underbody according to claim 11, wherein the support strut includes a first member loosely connected to the left front unitized underbody component and the vehicle body, and a second member loosely connected to the right front unitized underbody component and the vehicle body.

13. The vehicle underbody according to claim 12, wherein the support strut includes a third member that loosely connects the first member and the second member at each of the left front unitized underbody component and the right front unitized underbody component.

14. The vehicle underbody according to claim 1, further comprising a mounting surface provided on the right rear unitized underbody component.

15. The vehicle underbody according to claim 14, further comprising a bridge member loosely connected to the mounting surface.

16. A method of assembling a vehicle underbody formed from a system of unitized underbody components comprising:
forming a front quadrant system including a left front unitized underbody component including a first front suspension support component and a right front unitized underbody component including a second front suspension support component;
forming a rear quadrant system having a left rear unitized underbody component including a first rear suspension component support and a right rear unitized underbody component including a second rear suspension component support;
loosely connecting the front quadrant system and the rear quadrant system by connecting the left front unitized underbody component and the left rear unitized underbody component with a first rail element;
further loosely connecting the front quadrant system and the rear quadrant system by connecting the right front unitized underbody component and a right rear unitized underbody component with a second rail element forming the system of unitized underbody components;
placing the system of unitized underbody components into a jig to establish a selected relative position of the left front unitized underbody component, the right front unitized underbody component, the left rear unitized underbody component, and the right rear unitized underbody component; and
fixedly connecting the left front unitized underbody component, the right front unitized underbody component, the left rear unitized underbody component, and the right rear unitized underbody component to maintain the selected relative position and form a vehicle underbody.

17. The method of claim 16, wherein fixedly connecting the left front unitized underbody component, the right front unitized underbody component, the left rear unitized underbody component, and the right rear unitized underbody component includes tightening a plurality of mechanical fasteners.

18. The method of claim 16, wherein fixedly connecting the left front unitized underbody component, the right front unitized underbody component, the left rear unitized underbody component, and the right rear unitized underbody component includes applying an adhesive.

19. The method of claim 16, further comprising loosely connecting a support strut to each of the left front unitized underbody component, the right front unitized underbody component, and a vehicle body.

20. The method of claim 19, further comprising fixedly connecting the support strut to each of left front unitized underbody component, the right front unitized underbody component, and the vehicle body when the system of unitized underbody components is in the selected relative position.

\* \* \* \* \*